United States Patent [19]
Schmidt et al.

[11] Patent Number: 5,169,216
[45] Date of Patent: Dec. 8, 1992

[54] VEHICLE BRAKE SYSTEM WITH MEANS FOR TRACTION CONTROL

[75] Inventors: Guenther Schmidt, Tamm-Hohenstange; Anton V. Zanten, Ditzingen-Schoeckingen, both of Fed. Rep. of Germany

[73] Assignee: Robert Bosch GmbH, Stuttgart, Fed. Rep. of Germany

[21] Appl. No.: 649,627

[22] Filed: Feb. 1, 1991

[30] Foreign Application Priority Data

Feb. 14, 1990 [DE] Fed. Rep. of Germany ....... 4004483

[51] Int. Cl.⁵ .............................................. B60T 8/40
[52] U.S. Cl. ................................................ 303/116.2
[58] Field of Search ................. 303/116 SP, 113 TR, 303/115 PP, 115 FM, DIG. 4

[56] References Cited

U.S. PATENT DOCUMENTS

| | | | |
|---|---|---|---|
| 4,509,802 | 4/1985 | Solleder | 303/110 |
| 4,793,663 | 12/1988 | Ocvirk et al. | 303/113 TR |
| 4,861,116 | 8/1989 | Bernhardt et al. | 303/113 TR |

FOREIGN PATENT DOCUMENTS 2109882 6/1983 United Kingdom .

Primary Examiner—Joseph F. Peters, Jr.
Assistant Examiner—Anne E. Bidwell
Attorney, Agent, or Firm—Edwin E. Greigg; Ronald E. Greigg

[57] ABSTRACT

A vehicle brake system having a pump drivable via pressure from the master brake cylinder, a reservoir fillable by this pump, and an electrically controllable valve which, in traction control operation, pressure fluid from the reservoir can be delivered to an inlet of the return pump. Via the pressure fluid from the reservoir, this return pump generates pressure for the wheel brakes of the drivable wheels.

25 Claims, 5 Drawing Sheets

VEHICLE BRAKE SYSTEM WITH MEANS FOR TRACTION CONTROL

BACKGROUND OF THE INVENTION

The invention is based on a vehicle brake system as defined hereinafter.

A hydraulic vehicle brake system of this generic type, known from German Offenlegungsschrift 31 27 301, has anti-skid valves between the master brake cylinder and the wheel brakes, to prevent the danger of wheel locking, and return pumps communicating with these valves and with the master brake cylinder, along with additional means for limiting drive slip at driven wheels. These additional means include a separate pump, a pressure reservoir, electrically controllable valves, and a cylinder/piston arrangement connected to these controllable valves that is embodied as a pressure booster and can furnish brake pressure to perform traction control. The pressure furnished by the pressure booster is converted into suitable wheel brake pressures, using the anti-skid valves and the return pump. To assure that the pressure furnished by the pressure booster does not escape into the master brake cylinder, a shutoff valve that is closable by the pressure booster piston is provided. The high engineering cost for the additional means, which are built into the vehicle brake system to further provide traction control, is a disadvantage.

OBJECT AND SUMMARY OF THE INVENTION

The vehicle brake system according to the invention an advantage that the means required for performing traction control are less expensive and lighter in weight. In particular, an electric drive motor and switching means for supplying power to it can be dispensed with, resulting in an overall simplification of the vehicle brake system.

The provisions set forth herein define advantageous further embodiments of the vehicle brake system. Some advantages are such that per actuation of the brake pedal, even when the reservoir is empty, an allowable fraction of the master cylinder contents, at most, will leave the master brake cylinder. Accordingly, only an insignificantly lengthened master brake cylinder is needed for the vehicle brake system of the invention. Another advantage is that by using small quantities of pressure fluid positively displaced from the master brake cylinder, relatively large quantities of pressure fluid can be pumped into the reservoir. As a result, at typical master brake cylinder sizes, on the one hand few strokes of the brake pedal suffice to charge the reservoir, and on the other hand the by far predominant amount of pressure fluid contained in the master brake cylinder is available for optionally simultaneous execution of a braking event. As a result, despite its low engineering expense, the vehicle brake system is satisfactorily reliable in operation for traction control. The characteristics set forth disclose how much larger the quantities of pressure fluid furnished per stroke by the pump may advantageously be than the quantity of pressure fluid that the master brake cylinder must furnish for execution of the pump strokes. Other characteristics set forth have an advantage that the reservoir can be lightweight, yet nevertheless safe from disadvantageous pressure stresses that could in particular be possible from panic braking, if the pressure reduction were not selected to be adequately great. On the other hand, a particularly great pressure reduction would have the disadvantage that less forceful drivers might not be able to adequately charge the reservoir. The disclosure further discloses advantageous ways of embodying the reservoir in combination with the charge pressure limiter and the disposition of the reservoir relative to the pump. A modification sets forth a further exemplary embodiment for the spatial disposition of the reservoir relative to the pump and characteristics for protecting the return pump against an overload during traction control operation. Another advantage is that the pump pressure limiting valve, during normal braking, cannot cause an undesirable flow of pressure fluid from the outlet to the inlet of the return pump.

A further modification discloses a vehicle brake system for limiting drive slip at two driven wheels that are associated with a single brake circuit of an otherwise dual-channel brake system. Other features disclose an exemplary embodiment in which drivable vehicle wheels are associated with two brake circuits. Finally, an exemplary embodiment in which one reservoir is sufficient to supply two brake circuits with pressure fluid for the return pumps for traction control operation has been set forth.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
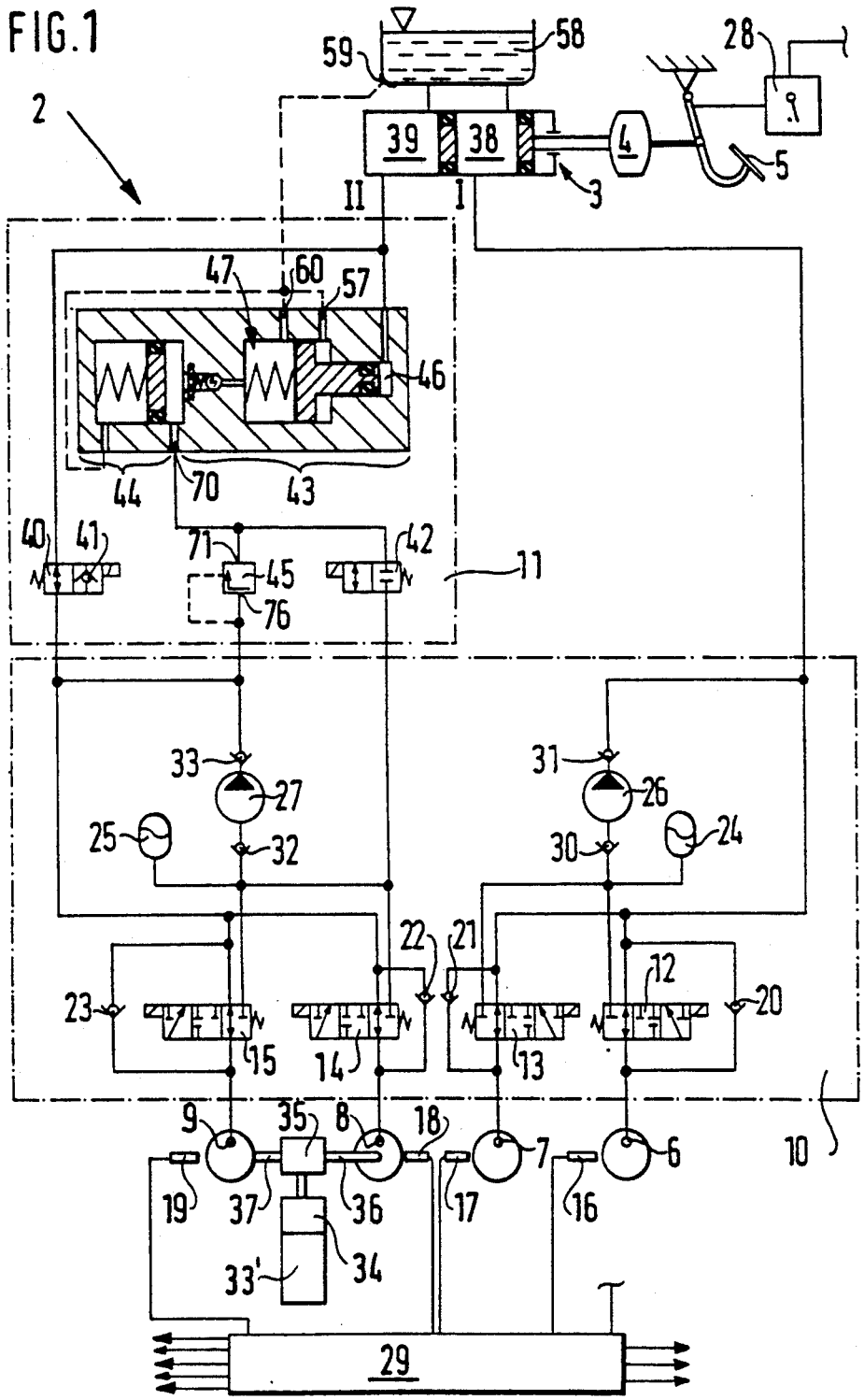
FIG. 1 shows a first exemplary embodiment, in which wheel brakes of two drivable wheels are associated with one brake circuit.

The first exemplary embodiment of the vehicle brake system 2 according to the invention, shown in FIG. 1, has a dual-circuit master brake cylinder 3, a brake booster 4, a brake pedal 5, brake circuits I and II, wheel brakes 6, 7, 8, 9, an anti-skid apparatus 10, and additional means 11 for traction control which will be further explained hereinafter.

The anti-skid apparatus 10 has one anti-skid valve assembly 12, 13, 14, 15 for each of the wheel brakes 6, 7, 8 and 9; wheel rotation sensors 16, 17, 18, 19; one-way check valves 20, 21, 22, 23; two pressure fluid holders or reservoirs 24, 25; two return pumps 26, 27; a brake light switch 28; and an electronic control unit 29.

The wheel rotation sensors 16, 17, 18, 19 and the brake light switch 28 are connected to the control unit for directed control signals to the control unit 29. The control unit 29 is also connected to the anti-skid valve assemblies 12, 13, 14, 15 for directing control signals to the different valves. The anti-skid valve assemblies in the exemplary embodiment are embodied as electromagnetically controllable 3/3-way valves. However, they could instead be replaced with a combination of 2/2-way valves, for instance. In their basic positions, the anti-skid valve assemblies 12 and 13 connect brake circuit I to the wheel brakes 6 and 7. The check valves 20, 21 are located so as to bypass these anti-skid valve assemblies 12 and 13 and can be opened in one direction. The check valves 20 and 21 are arranged such that they can allow brake pressures to escape from the wheel brakes 6 and 7 to the master brake cylinder 3 without passing through the control valves 12 and 13. In the first switching position, the anti-skid valve assemblies 12 and 13 block off brake circuit I or the master brake cylinder 3 from the wheel brakes 6 and 7. In a second control position, the anti-skid valve assemblies 12 and 13 connect the wheel brakes 6 and 7 both to the pressure fluid holder 24 and to an inlet of the return pump 26 via a one-way check valve 30. In this position, the wheel brakes 6, 7 are disconnected from the master brake cylinder 3. An outlet of this return pump 26 communicates via a one-way check valve 31 with the master brake cylinder 3 via the brake circuit 1. In the present exemplary embodiment, the wheel brakes 6 and 7 are assigned to nondrivable wheels of one axle.

As in the embodiment of brake circuit I, the anti-skid valve assemblies 14 and 15 and the check valves 22 and 23 the pressure fluid holder 25 and the return pump 27, with its inlet one-way check valve 32 and outlet one-way check valve 33, and the wheel brakes 8 and 9 are assigned to brake circuit II. The wheel brakes 8 and 9 belong to driven wheels of one vehicle axle. For driving these wheels, a drive unit having a drive motor 33', a gear 34 and a differential gear 35 is provided, which acts upon these driven wheels via axle shafts 36 and 37.

The anti-skid apparatus 10 is clearly equivalent to a conventional structure, so that a special explanation of the control unit 29 with respect to anti-skid operation is not intrinsically necessary. It will therefore merely be briefly noted that in normal braking, taking place without the danger of wheel locking, a first work chamber 38 and a second work chamber 39 of the master brake cylinder 3 are supplied with brake fluid, via brake circuits I and II and the anti-skid valve assemblies 12–15 pass the fluid under pressure to the wheel brakes.

The wheel brakes 6–9 are supplied with the pressure that is generated in the work chambers 38 and 39 by exertion of force upon the brake pedal 5 and by reinforcement from the brake booster 4, which can be found in the prior art. The danger of wheel locking is avoided in that the control unit 29 controls one or more of the anti-skid valve assemblies 12–15 into their second switch positions, so that overly high braking pressures in the wheel brakes escape from the wheel brakes, and pressure fluid flowing out of them collects in the pressure fluid holders 24 and 25, as applicable. The return pumps 26 and 27 switched on by the control unit 29 are filled from the pressure fluid holders 24 and 25 via their inlet one-way check valves 30 and 32, respectively. To this end, the pressure fluid holders 24 and 25 are for instance embodied as plunger reservoirs, which generate a feed pressure of 5 bar, for example, for filling the return pumps 26 and 27. The return pumps 26 and 27 furnish pressure fluid from the pressure fluid holders 24 and 25 to brake circuits I and II at elevated pressure. The feed pressures of the return pumps are limited to the pressures that are set in the master brake cylinder 3 upon actuation of the brake pedal 5.

The means 11 for performing traction control are built into brake circuit II of the driven wheels and include an electrically controllable 2/2-way valve 40, a one-way valve 41, a second electrically controllable 2/2-way valve 42, advantageously a pump 43, a reservoir 44, and for example a pump pressure limiting valve 45. The pump 43 has a primary chamber 46. A stroke volume of said primary chamber is less than half of that of the second work chamber 39 of the master brake cylinder 3.

The 2/2-way valve 40 is located between the second work chamber 39 of the master brake cylinder 3 and the anti-skid apparatus 10 and is open in the normal position. The one-way valve 41 is for example integrated with the 2/2-way valve 40 and is arranged such that when the 2/2-way valve 40 is triggered, it can be opened in the direction of the anti-skid apparatus 10 by means of pressure from the second work chamber 39 of the master brake cylinder 3. When the 2/2-way valve 40 is actuated, the one-way valve 41 remains in its closed position, if a higher pressure prevails at the outlet of the return pump 27 of the anti-skid apparatus 10 than in the second work chamber 39.

Figure 2:
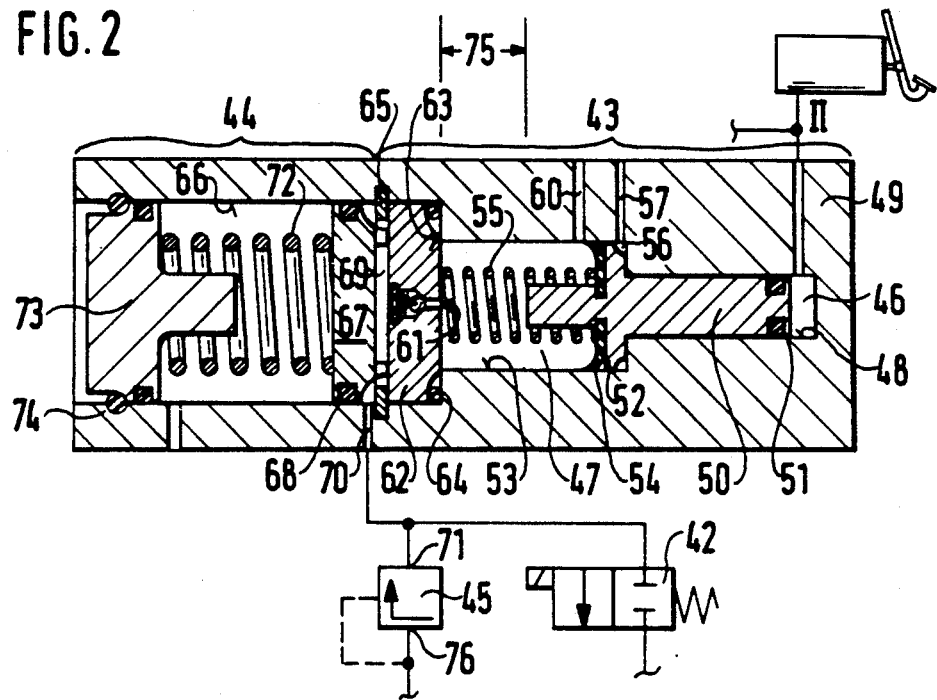
FIG. 2 is a longitudinal section on a larger scale of a detail of a portion of the vehicle brake system of FIG. 1.

The pump 43, which has a primary chamber 46 and a secondary chamber 47, is shown on a larger scale in FIG. 2. The primary chamber 46 is connected to the second work chamber 39 of the master brake cylinder 3 and is defined by a cylinder bore 48 located inside a housing block 49. A first piston 50 is displaceably disposed in this cylinder bore 40; it is sealed off from the cylinder bore 48 by means of a sealing ring 51 and is connected to a second piston 52. The second piston 52 can be displaced into the secondary chamber 47, which is defined by a cylinder bore 53. The second piston 52 has a diameter which is greater than that of the first piston 50, which can be up to six times as great. Relative to the cylinder bore 53, the second piston 52 is sealed off by means of a sealing sleeve 54. A restoring spring 55 pushes both pistons 50 and 52 into an outset position that is equivalent to the right-hand terminal position in FIG. 2. This terminal position is predetermined by a face 56 extending in the manner of an annular shoulder and forming a step between the cylinder bores 48 and 53. Immediately adjacent the face 56, a so-called refill opening 57 is provided, which as FIG. 1 shows communicates with a reservoir 58 of the master brake cylinder 3. It is intrinsically of no importance whether the refill opening 57 communicates with a connection 59 located laterally on the reservoir 58, or if the refill opening 57 communicates in a manner not shown here with a refill opening typically present in the master brake cylinder 3 and not shown here. A so-called poppet opening 60 also extends from the cylinder bore 53 and with the sleeve 54 in the normal position likewise connects the secondary chamber 47 with the reservoir 58. The poppet opening 60 and the sleeve 54 together form a pump inlet valve that is controllable by the piston 50 and may be replaced with a so-called central valve, known per se. A pump outlet valve 61, which is embodied in a manner known as per se as a one-way ball valve, is located inside a dividing bottom 62, which closes off the second chamber 47 opposite the second piston 52. The dividing bottom 62 rests on a face 63 embodied as an annular shoulder, which extends transversely to the cylinder bore 53 and limits its axial length. A sealing ring 64 prevents pressure fluid from passing between the face 63 and the dividing bottom 62. The dividing bottom 62 is fixed by means of a snap ring 65.

The dividing bottom 62 is located inside a further cylinder bore 66, which displaceably receives a piston 67. Relative to the cylinder bore 66, this piston 67 is sealed off by means of a sealing ring 68. The dividing bottom 62, the cylinder bore 66 and the piston 67 together define a reservoir chamber 69, the volume of which can be varied by displacing the piston 67. The reservoir chamber 69 communicates with an outlet 71 of the pump pressure limiting valve 45 and also with the 2/2-way valve 42, via a connection bore 70. A prestressed reservoir spring 72 urges the piston 67 toward the dividing bottom 62. The reservoir spring 72 is supported on a closure plug 73, which is retained in the cylinder bore 66 by means of a wire ring 74.

As already mentioned, the primary chamber 46 communicates with the second work chamber 39 of the master brake cylinder 3. A pressure generated in this work chamber 39 by actuation of the pedal 5 therefore causes action upon the first piston 50 of the pump 43. By means of pressure from the master brake cylinder, the piston 50 can therefore be displaced counter to the force of the restoring spring 55. In this process the second piston 52 will guide the sleeve 54 over the poppet bore and thereby separate the secondary chamber 47 from the reservoir 58. A pressure that leads to opening of the pump outlet valve 61 and filling of the reservoir 44 can therefore be built up within the secondary chamber 47 by means of a further displacement of the piston 50. The diameter of the primary chamber 46 and a structurally fixed displacement path 75 for the piston 50 determine the stroke volume of the piston 50. This stroke volume is preferably selected such that at least two strokes of the brake pedal 5 are required to pump enough pressure fluid to fill the reservoir 44; the reservoir must naturally be capable of holding enough pressure fluid that when it is shifted into the wheel brakes 8 and 9 it can generate sufficient braking moment for traction control. Two or more strokes of the brake pedal 5 are therefore advantageous, because if the reservoir 44 is insufficiently filled not all the pressure fluid positively displaced out of the second work chamber 39 would be available to the wheels brakes 8 and 9 if normal braking should become necessary. Otherwise, the master brake cylinder 3 should be made longer.

As FIG. 2 shows, the second piston 52 has a substantially greater diameter than the piston 50. Upon displacement of the pistons 50 and 52, a pressure attainable in the secondary chamber 47 will therefore be substantially below the pressure on the drive side on the primary chamber 46. This is intentional according to the invention, because as a result, a quantity of pressure fluid that is substantially greater than the quantity flowing from the second work chamber 39 into the primary chamber 46 in a pumping operation is then delivered per stroke to the reservoir 44.

An inlet 76 of the pump pressure limiting valve 45 communicates with the pump outlet one-way check valve 33 of the return pump 27. The 2/2-way valve 42 communicates not only with the reservoir 44 but also with the pump, inlet one-way check valve 32 of the return pump 27.

As already explained, the reservoir 44 can be charged via the pump 43 by actuation of the brake pedal 5. By a suitable selection of the diameters of the pistons 50 and 52, the reservoir 44 can be charged with a pressure that is intentionally below the pressures projected for so-called full braking. The maximum possible fill pressure of the reservoir 44 will preferably be preselected such that for instance it is only insignificantly higher than the pressure beyond which the wheel brakes 8 and 9, with their friction linings, not shown, generate braking moment.

In traction control operation, the vehicle brake system functions as follows.

The drivable wheels are driven by the drive unit 33', 34, via the differential gear 35 and the axle shafts 36 and 37. If the drivable wheels are running on a surface with good traction, and the power of the drive unit 34 is set such that problematic slip does not arise, then the control unit 29 cannot ascertain any requirement for braking moment, however, if drive moments at the drivable, wheels lead to disadvantageous slip relative to the road surface, the control unit recognizes this via signals derived from the wheel rotation sensors 18 and 19 of the drivable wheels. These signals are characteristically different from signals from the wheel rotation sensor 16 and 17 of the nondriven wheels. The control unit 29 also recognizes that the brake pedal 5 is not actuated, which of course is the case most of the time during driving. The brake light switch 28 remains unactuated in such a situation, leading the control unit 29 to conclude that drive slip is present. It will now be assumed that the wheel belonging to the wheel brake 8 is being increasingly accelerated, because there is inadequate traction. From the wheel rotation signals output by the wheel rotation sensor 18, the control unit 29 then recognizes that traction control should now be performed by means of the wheel brake 8. To this end, the control unit 29 controls the 2/2-way valve 40 into its closing position, switches on the return pump 27, and opens the 2/2-way valve 42, so that pressure fluid flows out of the reservoir 44 to the pump inlet one-way check valve 32 of the return pump 27 and as a result fills the return pump 27. A pressure built up upstream of the 2/2-way valve 40 through the pump outlet one-way check valve 33 of the return pump 27 is carried to the wheel brake 8, through the anti-skid valve assembly 14, which is in its basic position, in order to compensate for excessive drive torque. To prevent brake pressure from undesirably reaching the wheel brake 9, the control unit 29 controls the anti-skid valve assembly 15 into its first control position. As a result, pressure generated by the return pump 27 is kept away from the wheel brake 9. Once the driven wheel associated with it has been adequately slowed down because of the imposition of pressure on the wheel brake 8, the anti-skid valve assembly 14 is also controlled into its first switching position, thereby avoiding a further pressure rise in the wheel brake and an unnecessary loss of drive power. Since the return pump continues to pump, however, at least temporarily, it is provided by means of the pump pressure limiting valve 45 that quantities of pressure fluid leaving the pump outlet one-way check valve 33 can return to the pump inlet one-way check valve 32 of the return pump 27, by means of the pump pressure limiting valve 45 and the 2/2-way valve 42. If the control unit 29 ascertains that the drive slip of the wheel 8 associated with the wheel brake has been adequately reduced, then the wheel brake 8 is at least partly relieved of its brake pressure, using the anti-skid valve assembly 14. To this end, the control unit 29 directs the anti-skid valve assembly into its second switching position; as a result, the wheel brake 8 is made to communicate with both the pressure fluid holder 25 and the pump inlet one-way check valve 32 of the return pump 27.

After that, the same sequence of events can be repeated at the wheel brake 9.

Excessively increasing drive slip at a driven wheel associated with the wheel brake 9 causes the same kind of intervention by the control unit 29. Naturally it may also happen that drive slip occurs simultaneously at two driven wheels. Then the control unit 29 will naturally trigger both anti-skid valve assemblies 14 and 15, to generate braking moment that compensates for excessive drive torque. If no brake pressures are delivered to the wheel brakes 8 and 9 during a predeterminable period of time, the return pump 27 can be switched off, and the control unit 29 then allows the 2/2-way valves 40 and 42 to return to their outset positions as well.

In the event that vehicle braking should become necessary during a traction control operation, which can occur particularly with automatic transmissions when driving over ice in winter, then the brake pressure in the wheel brakes 8 and 9 can be raised by providing that the control unit, by actuation of the brake pedal and via the switch 28, recognizes the necessity for opening the 2/2-way valve 40. On the other hand, the fact that the one-way valve 41 is built in already assures that if the 2/2-way valve 40 is switched back into its basic position at the wrong time, or fails to be switched back into its basic position, pressure fluid can be forced into the anti-skid apparatus 10 and the wheel brakes 8 and 9 by means of the master brake cylinder 3. All that is necessary then is for the anti skid valve assemblies 14 and 15 to assure their basic positions.

The combination of a pump 43 and the reservoir 44 used in the exemplary embodiment of FIG. 1 results in a modular kind of construction that is favorable from a manufacturing standpoint and can be used in order to integrate this combination with the anti-skid apparatus 10 or even with the master brake cylinder 3, in such a way that fewer lines need to be provided.

Figure 3:
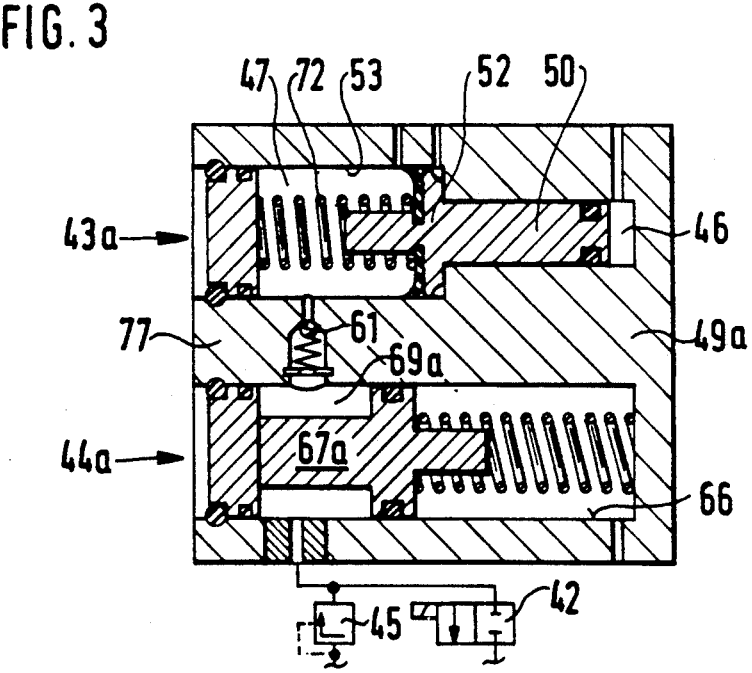
FIG. 3 is a longitudinal section through an alternative version of the exemplary embodiment of FIG. 2.

Instead of the combination of the pump 43 with the reservoir 44 disclosed in FIG. 2, a combination of a pump 43a with a reservoir 44a can also be used, as shown in FIG. 3. There the pump pistons 50 and 52 are disposed beside one another, parallel to and offset from a piston 67a of the reservoir 44a. The secondary chamber 47 and the pump 43a are placed in such a way beside a reservoir chamber 69a of the reservoir 44a that there is room for a pump outlet valve 61 in a bridge 77 of material between the secondary chamber 47 and the reservoir chamber 69a. Depending on the overall design, the exemplary embodiment of FIG. 3 may be practical, for instance because the cylinder bores required can be made simultaneously beside one another using two tools.

Instead of the reservoir shown in FIGS. 2 and 3, having pistons displaceable counter to reservoir springs, other types of reservoirs that can be found in the prior art can naturally also be used.

Figure 4:
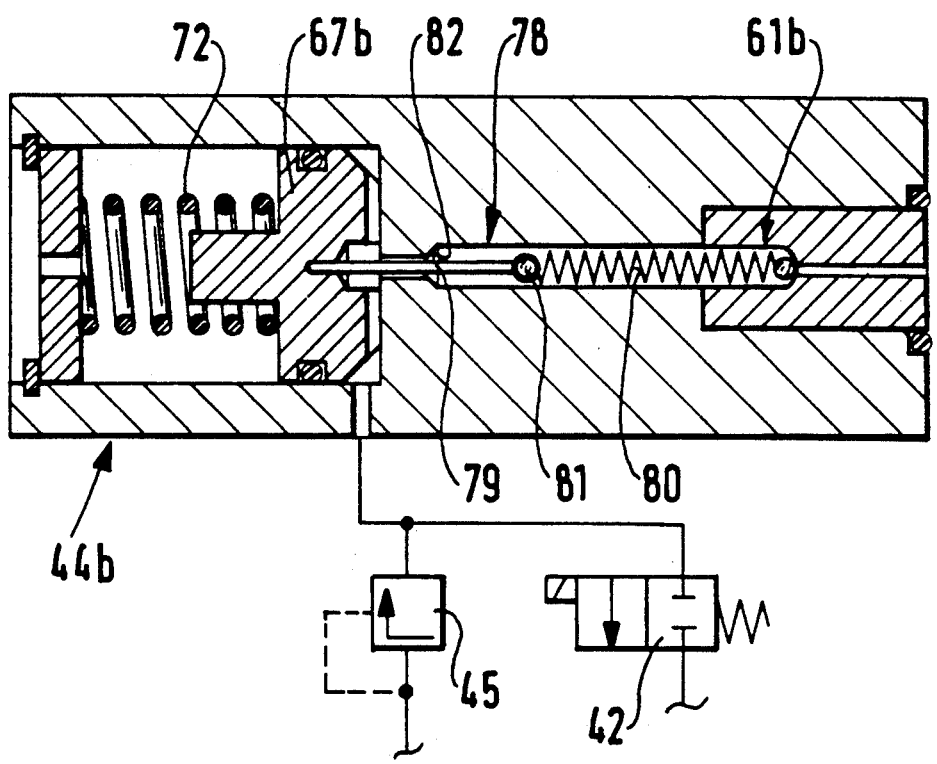
FIG. 4 shows a further interchangeable detail of the vehicle brake system according to the invention.

A reservoir 44b shown in FIG. 4 differs from the reservoirs described above substantially in that its piston 67b, in cooperation with a valve 78, forms a charge pressure limiter. The valve 78 is embodied for this purpose as a so-called ball check valve, having a valve seat 82 and a ball 81, which is displaceable by means of the piston 67b via a tappet 79 counter to the force of a closing spring 80. If the piston 67b is increasingly displaced counter to the force of the reservoir spring 72 by means of a pump outlet valve 61b, then the tappet 79 connected to the piston 67b opens the way for the ball 81, which is subject to the action of a closing spring 80, to move toward the valve seat 82. The ball 81 finally takes its seat in a sealing manner on the valve seat 82. After that, the pressure inside the reservoir 44b can no longer rise. This has the advantage that in traction control operation, overly high pressures cannot remain in the wheel brakes 8 or 9 and cause unnecessary wear of brake linings. The disposition of a charge pressure limiter embodied in this way is also advantageous because it is not possible to assure at the outset that a driver will actuate the brake pedal 5 with precisely a prescribed force. Quite the contrary, a wide range of possible master brake cylinder pressures must be expected, dictated by quite different conditions and temperaments. Naturally, the disposition of such a charge pressure limiter also makes it possible to provide a lesser pressure reduction in the pump 43, or to omit the pump.

Instead of the exemplary embodiment of a charge pressure limiter shown, it is also naturally possible to use a separately disposed pressure limiting valve known from the field of general hydraulics. In that case it would not matter whether this valve is hydraulically or electrically controlled, using a pressure sensor, or a sensor measuring the displacement of a reservoir piston.

Figure 5:
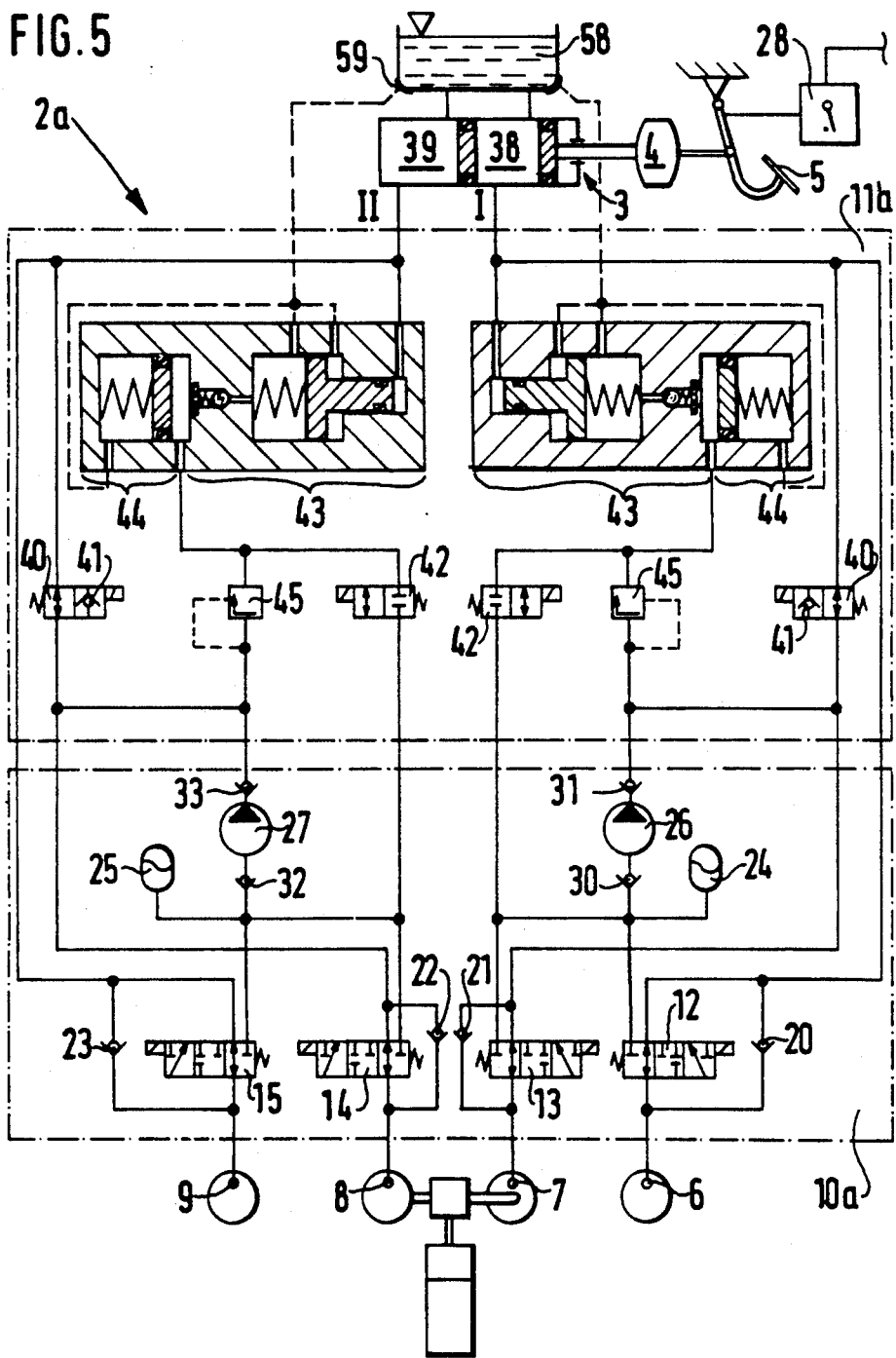
FIG. 5 shows an exemplary embodiment in which wheel brakes of drivable wheels are distributed to two brake circuits.

The exemplary embodiment of a vehicle brake system 2a of FIG. 5 differs from that of FIG. 1 in that the drivable wheels of a vehicle axle are this time assigned to the wheel brakes 7 and 8, with the wheel brake 7 belonging to brake circuit I and the wheel brake 8 belonging to brake circuit II. As a result, the means 11a provided for traction control in brake circuit I have a second reservoir 44, preceded by its own pump 43, which is actuated by means of pressure from the first work chamber 39 of the master brake cylinder 3. Second fluid control valves 40, 41, 42 and 45 are provided.

To take into account the variable assignment of wheel brakes to driven wheels, yet keep the basic structure of FIG. 1, an advantageous adaptation to the desirable line layout resulting from the different brake assignment has been made. Only the wheel brakes 7 and 8, which this time have been assigned to the drivable wheels, are supplied with pressure fluid from the master brake cylinder 3 via the two 2/2-way valves 40. The two other wheel brakes 6 and 9, to which nondrivable wheels are assigned, communicate with the master brake cylinder 3 directly for safety reasons, via their anti-skid valve assemblies 12 and 15. In the example of FIG. 5 it can be seen that accordingly only one wheel brake is assigned to limit drive slip in each brake circuit, while the other wheel brake is used only in normal braking operation. Because of the already described disposition of the 2/2-way valves, all that is necessary in traction control operation is to trigger the anti-skid valve assemblies 13 and 14, with a control unit not shown here. The other two anti-skid valve assemblies 12 and 15 remain unaffected. Since the Vehicle brake system 2a is operated by the same principle as the vehicle brake system 2 of FIG. 1, it requires no further detail description. The pumps 43 and the reservoirs 44 can naturally be replaced with the alternatives disclosed in FIG. 3. The reservoir 44b of FIG. 4 can logically be used as well.

Figure 6:
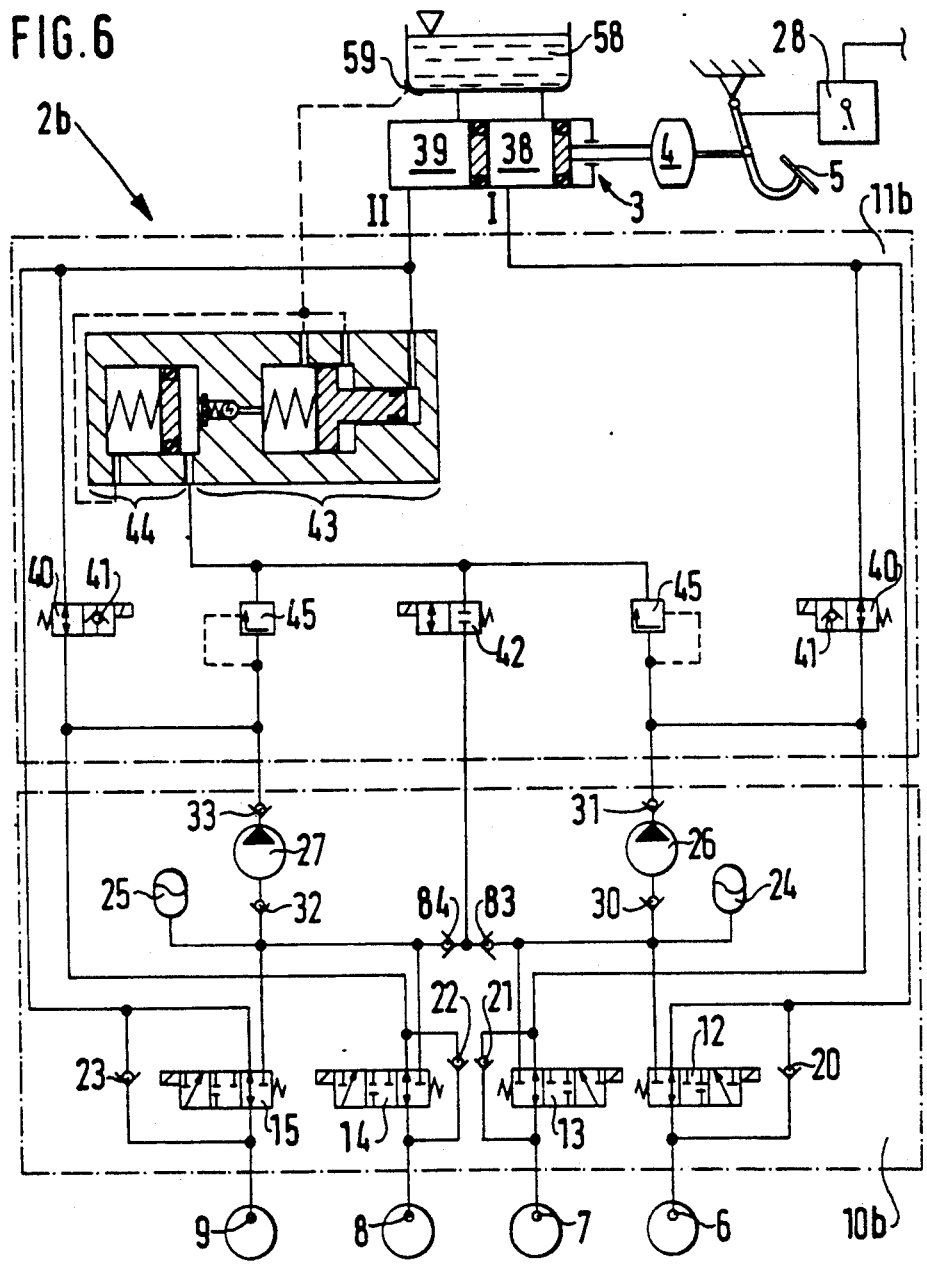
FIG. 6 shows a less expensive embodiment, in which wheel brakes of drivable wheels are again distributed to two brake circuits.

An exemplary embodiment of the vehicle brake system 2b according to the invention as shown in FIG. 6 is arranged, like the exemplary embodiment of FIG. 5, with brake circuits I and II, to each of which one wheel brake 7 and 8 of a respective drivable wheel are connected. For this purpose, a 2/2-way valve 40 in brake circuit I is again assigned to the wheel brake 7. A 2/2-way valve 40 is likewise assigned to the wheel brake 8 in brake circuit II. The return pumps 26 and 27 are likewise again protected against an overload by means of their own pump pressure limiting valves 45. Unlike the exemplary embodiment of FIG. 5, that of FIG. 6 has only one pump 43 and one reservoir 44. One 2/2-way valve 42 therefore suffices to cause pressure fluid present in the reservoir 44 to flow out of the reservoir 44 to the return pumps 26, 27 for traction control. Since as already described, traction control is to be performed in both brake circuits I and II by means of the anti-skid valve assemblies 13 and 14 disposed in the anti-skid apparatus 10b, which assemblies are assigned to the wheel brakes 7 and 8 of drivable wheels, two check valves 83 and 84 are provided downstream of the 2/2-way valve 42. The check valve 83 can be opened toward the brake circuit I, so that it can cause brake fluid to flow to the pump inlet one-way check valve 30 of the return pump 26. The other check valve 84 opens toward brake circuit II and supplies the pump inlet one-way check valve 32 of the other return pump 27. It will be appreciated that in anti-skid operation the check valves 83 and 84 hydraulically disconnect the two brake circuits I and II from each other.

The exemplary embodiments described are intended for vehicles equipped with four brakable wheels, such as passenger cars. With the knowledge of one skilled in the art of braking, the exemplary embodiments can be modified for vehicles with four-wheel drive and for motor cycles.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A hydraulic vehicle braking system comprising a master brake cylinder, having at least one wheel brake on a drivable vehicle wheel and one anti-skid apparatus, at least one anti-skid valve assembly between the master brake cylinder and the at least one wheel brake and at least one return pump and a control unit for controlling the anti-skid valve assembly and the return pump, said control unit processes signals from at least one wheel rotation sensor, and associated with said brake system are traction control means, the anti-skid valve assembly, the return pump, and the traction control means includes a controllable valve that in traction control operation prevents an outflow of pressure fluid into the master brake cylinder and a pressure reservoir for receiving pressure fluid, said pressure reservoir (44) is made to communicate, via an electrically openable valve (42), with a pump inlet one-way check valve (30, 32) of the return pump (26, 27), and that the master brake cylinder (3) embodies an energy source for charging the pressure reservoir (44, 44a, 44b).

2. A vehicle brake system as defined by claim 1, in which the means determining traction control operation further includes a second pump (43, 43a) drivable by means of pressure from the master brake cylinder (3), said second pump includes a primary chamber (46), connected to the master brake cylinder (3), said second pump has a stroke volume that is less than that of an associated work chamber (38, 39) of the master brake cylinder (3), and a secondary chamber (47) of said second pump communicates with the pressure reservoir (44, 44a, 44b) and can be filled from a master cylinder reservoir (58) of the master brake cylinder (3).

3. A vehicle brake system as defined by claim 2, in which the second pump (43, 43a) has a first piston (50), associated with the primary chamber (46), and a second piston (52) in said secondary chamber (47), a diameter of the second piston (52) being greater than that of the first piston (50).

4. A vehicle brake system as defined in claim 2, in which a charge pressure limiter is associated with the pressure reservoir (44, 44a, 44b).

5. A vehicle brake system as defined in claim 2, in which a pump pressure limiting valve (45) is disposed between the pump outlet one-way check valve (31, 33) of the return pump (26, 27) and the pressure reservoir (44).

6. A vehicle brake system as defined in claim 2, in which said at least one return pump (27) is assigned to two wheel brakes (8, 9), which belong to one vehicle axle having two drivable wheels.

7. A vehicle brake system as defined by claim 2, in which the vehicle brake system (2a) includes two brake circuits (I, II) with four wheel brakes (6, 7, 8, 9); the master brake cylinder (3) includes two work chambers (38, 39); there are two return pumps (26, 27) and a separate pressure reservoir (44) for each of said two return pumps, an electrically controllable 2/2-way valve (40) in each of said brake circuits (I, II) for disconnecting the brake circuits (I, II) from said wheel brakes, and one each further 2/2-way valve (42) disposed between each separate pressure reservoir (44) and the pump inlet one-way check valve (30, 32) of the return pump (26 or 27, respectively).

8. A vehicle brake system as defined by claim 2, in which the vehicle brake system (2b) is embodied with two brake circuits (I, II); that one wheel brake (7, 8) of at least one drivable wheel is assigned to each brake circuit; that the master brake cylinder (3) has two work chambers (38, 39); and that two return pumps (26, 27) are provided, which can each be filled via its own one-way check valve (83, 84), via an electrically openable valve (42), from the pressure reservoir (44).

9. A vehicle brake system as defined by claim 3, in which a charge pressure limiter is associated with the pressure reservoir (44, 44a, 44b).

10. A vehicle brake system as defined by claim 3, in which the second pump (43a) and the pressure reservoir (44a), which has a piston (67a), are accommodated beside one another, with their longitudinal axes aligned parallel, in a housing block (49a), and that an outlet valve (61) of the second pump (43a) is disposed in the housing block (49a) between a cylinder bore (53) defining a secondary chamber (47) and a cylinder bore (66) receiving a piston (67a) of the pressure reservoir (44a).

11. A vehicle brake system as defined by claim 3, in which the second pump (43) and the pressure reservoir (44) includes a piston (67) accommodated coaxially in a housing block (49), and that a cylinder bore (53) defining a secondary chamber (47) of the second pump (43) and a cylinder bore (66) receiving the piston (67) of the pressure reservoir (44) border on one another, and that a dividing bottom (62) closes off the cylinder bore (66) of the pressure reservoir (44) from the second pump (43), an outlet valve (61) of the second pump (43) is built into a dividing bottom (62).

12. A vehicle brake system as defined by claim 3, in which a pump pressure limiting valve (45) is disposed between the pump outlet one-way check valve (31, 33) of the return pump (26, 27) and the pressure reservoir (44).

13. A vehicle brake system as defined by claim 3, in which said at least one return pump (27) is assigned to two wheel brakes (8, 9), which belong to one vehicle axle having two drivable wheels.

14. A vehicle brake system as defined by claim 3, in which the vehicle brake system (2b) is embodied with two brake circuits (I, II); that one wheel brake (7, 8) of at least one drivable wheel is assigned to each brake circuit; that the master brake cylinder (3) has two work chambers (38, 39); and that two return pumps (26, 27) are provided, which can each be filled via its own one-way check valve (83, 84), via an electrically openable valve (42), from the pressure reservoir (44).

15. A vehicle brake system as defined by claim 2, in which the vehicle brake system (2a) includes two brake circuits (I, II) with four wheel brakes (6, 7, 8, 9); the master brake cylinder (3) includes two work chambers (38, 39); there are two return pumps (26, 27) and a separate pressure reservoir (44) for each of said two return pumps, an electrically controllable 2/2-way valve (40) in each of said brake circuits (I, II) for disconnecting the brake circuits (I, II) from said wheel brakes, and one each further 2/2-way valve (42) disposed between each separate pressure reservoir (44) and the pump inlet one-way check valve (30, 32) of the return pump (26 or 27, respectively).

16. A vehicle brake system as defined by claim 3, in which the diameter of the second piston (52) is up to six times greater than that of the first piston (50).

17. A vehicle brake system as defined by claim 16, in which a charge pressure limiter is associated with the pressure reservoir (44, 44a, 44b).

18. A vehicle brake system as defined by claim 1, in which a charge pressure limiter is associated with the pressure reservoir (44, 44a, 44b).

19. A vehicle brake system as defined by claim 18, in which the charge pressure limiter is embodied as a valve (78) that is closable as a function of the fill ratio of the reservoir (44a).

20. A vehicle brake system as defined by claim 19, in which the pressure reservoir (44, 44a, 44b) has a wall (67b) that is movable upon imposition of pressure and a control means (79), coupled to this wall, for the valve (78).

21. A vehicle brake system as defined by claim 20, in which the movable wall is embodied as a piston (67b), and the control means is embodied as a tappet (79) which opens the valve (78).

22. A vehicle brake system as defined by claim 1, in which a pump pressure limiting valve (45) is disposed between the pump outlet one-way check valve (31, 33) of the return pump (26, 27) and the pressure reservoir (44).

23. A vehicle brake system as defined by claim 1, in which said at least one return pump (27) is assigned to two wheel brakes (8, 9), which belong to one vehicle axle having two drivable wheels.

24. A vehicle brake system as defined by claim 1, in which the vehicle brake system (2a) includes two brake circuits (I, II) with four wheel brakes (6, 7, 8, 9); the master brake cylinder (3) includes two work chambers (38, 39); there are two return pumps (26, 27) and a separate pressure reservoir (44) for each of said two return pumps, an electrically controllable 2/2-way valve (40) in each of said brake circuits (I, II) for disconnecting the brake circuits (I, II) from said wheel brakes, and one each further 2/2-way valve (42) disposed between each separate pressure reservoir (44) and the pump inlet one-way check valve (30, 32) of the return pump (26 or 27, respectively).

25. A vehicle brake system as defined by claim 1, in which the vehicle brake system (2b) is embodied with two brake circuits (I, II); that one wheel brake (7, 8) of at least one drivable wheel is assigned to each brake circuit; that the master brake cylinder (3) has two work chambers (38, 39); and that two return pumps (26, 27) are provided, which can each be filled via its own one-way check valve (83, 84), via an electrically openable valve (42), from the pressure reservoir (44).

* * * * *